3,082,095
Patented Mar. 19, 1963

3,082,095
METHOD OF DUST-PROOFING OF AN EDIBLE, DRY, FINELY DIVIDED PRODUCT AND THE RESULTING PRODUCT
William Delaney, Chicago, Ill., assignor to Kadison Laboratories, Inc., Chicago, Ill., a corporation of Delaware
No Drawing. Filed Apr. 7, 1961, Ser. No. 101,370
6 Claims. (Cl. 99—140)

My invention is directed to the treatment of edible, dry, finely divided products which are normally characterized by the tendency to dusting upon being agitated so as to reduce appreciably such dusting tendency.

Various edible, dry, finely divided products present certain difficult problems in handling and usage due to their tendency to form dusts which are irritating to the eyes, nose and throat. Such dusting commonly occurs when said products are removed from their shipping containers for handling operations, and when the said products are added to other ingredients in various mixing procedures, generally those involving agitation by cutters or mixers, in connection with the production of finished or semi-finished compositions. While the edible, dry, finely divided products which possess this tendency to dusting upon being agitated run the gamut of many different types of products, the problem of dusting is particularly acute in relation to finely divided or powdered nonfat milk solids such as roller dried and spray dried skim milk and sodium caseinate; vegetable gums such as karaya, guar, acacia, tragacanth, agar, and locust bean; the powdered food phosphates, particularly of anhydrous character and finer than 60 mesh powders; dried corn syrup solids; and powdered egg albumen.

My present invention is based on the discovery that certain types of edible ground spices, advantageously ground to a fineness such as to pass a 50 mesh screen and, better still, finer and floury in character, when added in certain proportions to edible, dry, finely divided products which have a tendency to form dusts upon agitation, surprisingly bring about marked improvement with respect to dusting in that they very appreciably reduce such dusting tendency. The edible ground spices which possess this property are those which have an ethyl ether extract content of at least 7.5%. Typical of such operative edible ground or floury spices are coriander, mustard, mustard bran, paprika, mace and nutmeg. I have found, further, that said edible ground spices must be used in amounts equal to at least 5% by weight of the total of the mixture of said ground spices with the edible, dry, finely divided product. While there is no real upper limit from an operative standpoint to the percentage of the ground or floury spices in the mixture with the edible, dry, finely divided product, from a practical standpoint the upper percentage will generally not exceed about 20%. In most cases, from 5 or 6% to 10% will be found to be most suitable.

To determine whether a given ground spice is suitable for use in the practice of the present invention, a Soxhlet continuous extraction apparatus is employed utilizing a 250 cc. extraction flask and a 33 x 80 mm. extraction thimble. The extraction thimble is charged with a 10 gram sample of the ground spice and the extraction flask is charged with 125 cc. of ethyl ether. The extraction is carried out over a 12 hour period, the resulting ether spice extract solution is evaporated, and the residual extract dried in an air convection oven at 100–105 degrees centigrade for 16 hours. If the dried extract amounts to at least 7.5% by weight of the original ground spice (in the given example at least 0.75 grams of dried extract based on the 10 gram sample of the ground spice), then the said ground spice is suitable for the purpose of the present invention when employed in an amount of at least 5% by weight of the mixture of said ground spice and the edible product to be treated to improve its properties with respect to dusting.

The following are illustrative examples of compositions made in accordance with my invention. It will be understood, of course, that other compositions can readily be evolved in the light of the guiding principles and teachings provided herein. All parts listed are by weight.

*Example 1*

| | |
|---|---|
| Spray dried skim milk powder | 95 |
| Ground mustard bran | 5 |

*Example 2*

| | |
|---|---|
| Roller dried skim milk powder | 92 |
| Ground paprika | 8 |

*Example 3*

| | |
|---|---|
| Powdered sodium caseinate | 90 |
| Ground coriander | 10 |

*Example 4*

| | |
|---|---|
| Spray dried skim milk powder | 92 |
| Ground mustard bran | 4 |
| Ground paprika | 4 |

*Example 5*

| | |
|---|---|
| Powdered sodium caseinate | 88 |
| Ground nutmeg | 12 |

*Example 6*

| | |
|---|---|
| Powdered guar | 85 |
| Ground mustard bran | 15 |

*Example 7*

| | |
|---|---|
| Powdered sodium caseinate | 87 |
| Ground mustard bran | 5 |
| Ground coriander | 4 |
| Ground mace | 4 |

*Example 8*

| | |
|---|---|
| Spray dried egg albumen powder | 93 |
| Ground coriander | 7 |

*Example 9*

| | |
|---|---|
| Powdered corn syrup solids | 93 |
| Ground mace | 7 |

While particular embodiments of the invention have been described in order to illustrate the invention, it will be obvious to those skilled in the art that various changes and modifications may be made, in the light of the guiding principles and teachings provided herein, without departing from the invention in its broader aspects and, therefore, the appended claims are intended to encompass all such changes and modifications as fall within the spirit and scope of the invention.

What I claim as new and desire to protect by Letters Patent of the United States is:

1. A method of reducing the dusting characteristics of edible, dry, finely divided products which comprises intimately admixing therewith at least one edible finely ground spice, characterized by an ethyl ether extract content of at least 7.5%, said edible finely ground spice being utilized in an amount equal to at least 5% by weight of the mixture thereof with said edible, dry, finely divided products.

2. The method of claim 1, wherein the edible, dry, finely divided product is powdered sodium caseinate, and wherein the amount of said edible finely divided ground spice is from 5 to 10%.

3. A new and useful edible, dry, finely divided product having improved properties with respect to dusting, said product comprising a mixture of (a) a dry, finely divided edible material normally characterized by the tendency to dusting upon being agitated, and (b) at least one edible finely ground spice characterized by an ethyl ether extract content of at least 7.5%, said (b) ingredient constituting at least 5% by weight of the mixture of said (a) and (b) ingredients.

4. A new and useful edible, dry, finely divided product having improved properties with respect to dusting, said product comprising a mixture of (a) at least one member selected from the group consisting of dry, finely divided non-fat milk solids, sodium caseinate, corn syrup solids, egg albumen, vegetable gums, and food phosphates, said (a) material being normally characterized by the tendency to dusting upon being agitated, and (b) at least one edible finely ground spice characterized by an ethyl ether extract content of at least 7.5%, said (b) ingredient constituting from 5 to 20% by weight of the mixture of said (a) and (b) ingredients.

5. A new and useful edible, dry, finely divided product having improved properties with respect to dusting, said product comprising a mixture of (a) a dry, finely divided edible material normally characterized by the tendency to dusting upon being agitated, and (b) at least one edible finely ground spice selected from the group consisting of coriander, mustard, mustard bran, paprika, mace and nutmeg, said (b) ingredient constituting at least 5% by weight of the mixture of said (a) and (b) ingredients.

6. A new and useful edible, dry, finely divided product having improved properties with respect to dusting, said product comprising a mixture of (a) at least one member selected from the group consisting of dry, finely divided non-fat milk solids, sodium caseinate, corn syrup solids, egg albumen, vegetable gums, and food phosphates, said (a) material being normally characterized by the tendency to dusting upon being agitated, and (b) at least one edible finely ground spice selected from the group consisting of coriander, mustard, mustard bran, paprika, mace and nutmeg, said (b) ingredient constituting from 5 to 20% by weight of the mixture of said (a) and (b) ingredients.

References Cited in the file of this patent

UNITED STATES PATENTS

| | | |
|---|---|---|
| 2,421,185 | Comstock | May 27, 1947 |
| 2,772,977 | Ansel | Dec. 4, 1956 |